United States Patent [19]

Fung et al.

[11] Patent Number: 4,782,900
[45] Date of Patent: Nov. 8, 1988

[54] AMINOALKYLATED POLYACRYLAMIDE ALDEHYDE GELS, THEIR PREPARATION AND USE IN OIL RECOVERY

[75] Inventors: Fu-Ning Fung, Salem; Raymond C. Glowaky, Niantic, both of Conn.

[73] Assignee: Pfizer Inc., New York, N.Y.

[21] Appl. No.: 42,073

[22] Filed: Apr. 24, 1987

[51] Int. Cl.$^4$ ............................................. E21B 33/138
[52] U.S. Cl. .................................... 166/270; 166/295; 166/300; 523/130
[58] Field of Search ............... 166/270, 294, 295, 300, 166/281; 405/264; 523/130, 132

[56] References Cited

U.S. PATENT DOCUMENTS

| | | | |
|---|---|---|---|
| 3,455,393 | 7/1969 | Bradley | 166/295 X |
| 3,759,197 | 9/1973 | Bracke | 405/264 X |
| 3,795,276 | 3/1974 | Eilers et al. | 166/294 X |
| 4,155,405 | 5/1979 | Vio | 166/295 |
| 4,182,417 | 1/1980 | McDonald et al. | 166/295 |
| 4,199,625 | 4/1980 | Pilny et al. | 166/295 X |
| 4,210,206 | 7/1980 | Ely et al. | 166/294 |
| 4,291,069 | 9/1981 | Pilny | 427/140 |
| 4,330,450 | 5/1982 | Lipowski et al. | 166/295 X |
| 4,461,351 | 7/1984 | Falk | 166/295 |

OTHER PUBLICATIONS

R. E. Terry et al., Soc. Pet. Engrs. J., pp. 229–235 (1981).

Primary Examiner—George A. Suchfield
Attorney, Agent, or Firm—Peter C. Richardson; Lawrence C. Akers; Harold W. Ordway

[57] ABSTRACT

Aqueous gel-forming compositions useful for improving oil recovery from subterranean hydrocarbon-containing reservoirs are prepared by reacting an aminoalkylated polyacrylamide with an aldehyde, dialdehyde or derivative thereof in aqueous medium. These compositions are particularly effective in reducing excessive water encroachment at producer wells.

5 Claims, No Drawings

AMINOALKYLATED POLYACRYLAMIDE ALDEHYDE GELS, THEIR PREPARATION AND USE IN OIL RECOVERY

BACKGROUND OF THE INVENTION

This invention concerns novel aminoalkylated polyacrylamide gels particularly useful for the recovery of oil from subterranean reservoirs.

The strata of subterranean oil-producing reservoirs are rarely formed of homogeneous masses, but rather are usually layered, with significant variation in permeability from zone to zone. This permeability variation is often further complicated by fractures, both natural and man-made, in the strata. Such heterogeneity at the injector well leads to rapid breakthrough of the water or other flooding media, such as carbon dioxide or hydrocarbon-miscible agents, being used in an enhanced oil recovery operation. This results in poor sweep efficiency and underproduction of recoverable reserves. At the producer well, the heterogeneity causes excessive encroachment of the flooding media with attendant higher production costs. Water encroachment at the well can also arise from coning of bottom water.

Many methods for modifying the fluid flow characteristics in the near wellbore area of affected wells to improve oil production have been tried. In recent years, the use of cross-linked polymer gels has become the method of choice since these gels can reduce zone permeability without complete plugging and, with producer well treatments, allow continued oil production. Such gels include ionically cross-linked polyacrylamide chrome gels and, more recently, dialdehyde cross-linked polyacrylamide gels, as exemplified by the gel of U.S. Pat. No. 4,155,405.

While such gels have proven to be beneficial in improving oil production efficiency, the need for a gel of improved permeability and strength characteristics still exists. It is therefore the primary objective of the present invention to satisfy this need.

SUMMARY OF THE INVENTION

We have now found that certain aminoalkylated polyarylamide polymers when cross-linked with aldehyde produce aqueous gels with such superior permeability and strength characteristics.

The present invention therefore entails an aqueous gel-forming composition which comprises an aminoalkylated polyacrylamide having a molecular weight of from about 500,000 to 15 million and a structural formula I

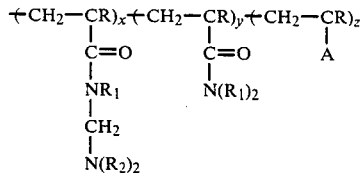

wherein
$x/(x+y+z)$ = about 0.05 to 0.99,
$z/(x+y+z)$ = 0 to about 0.3,
R = H or methyl,
$R_1$ = H or alkyl of from 1 to 4 carbons,
$R_2$ = alkyl of from 1 to 4 carbons, 2-hydroxyalkyl of 2 or 3 carbons, or when taken together with the nitrogen atom to which they are attached complete a morpholine ring, and
A = COOH, COOM, or $COOR_3$
wherein
M = alkali metal or $NH_4$, and
$R_3$ = alkyl of from 1 to 4 carbons,
combined with an aldehyde or dialdehyde of from 1 to 6 carbons, or derivatives thereof, in aqueous medium.

Preferably, the concentration of the aminoalkylated polyacrylamide in the composition is from about 500 to 20,000 ppm and the aldehyde concentration is from about 5 to 100 percent by weight of the polyacrylamide. In such case, the aminoalkylated polyacrylamide preferably has a molecular weight of from about 1 to 10 million; R and $R_1$ H, $R_2$ = methyl, A = COOH or COOM, $x/(x+y+z)$ = about 0.6 to 0.8, and $z/(x+y+z)$ = 0 to about 0.1; and the aldehyde is glyoxal or glutaraldehyde.

The present invention also contemplates a process for preparing an aqueous gel, which comprises contacting
(a) water;
(b) aminoalkylated polyacrylamide having a molecular weight of from about 500,000 to 15 million and the structural formula I; and
(c) an aldehyde or dialdehyde of from 1 to 6 carbons, or derivatives thereof, at a temperature of from about 5° to 95° C. and pH of from about 5 to 10 to form a gel-forming composition, and allowing the composition to gel.

With this process, the concentration of the aminoalkylated polyacrylamide in the composition is preferably from about 500 to 20,000 ppm with the aldehyde concentration from about 5 to 100 percent by weight of the polyacrylamide. In such case, the aminoalkylated polyacrylamide preferably has a molecular weight of from about 1 to 10 million; R and $R_1$ = H, $R_2$ = methyl, A = COOH or COOM, $x/(x+y+z)$ = about 0.6 to 0.8, and $z/(x+y+z)$ = 0 to about 0.1; the aldehyde is glyoxal or glutaraldehyde; and the gelling of the composition occurs at a temperature of from about 10° to 80° C., preferably at a pH of from about 5.5 to 8.5.

The present invention further contemplates an aqueous gel-forming composition useful for improving oil recovery from strata of a subterranean hydrocarbon-containing reservoir, prepared by adding from about 500 to 20,000 ppm of an aminomethylated polyacrylamide of molecular weight of from about 1 to 10 million and structural formula II

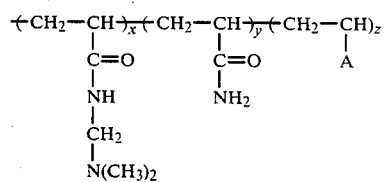

wherein
$x/(x+y+z)$ about 0.6 to 0.8,
$z/(x+y+z)$ 0 to about 0.1,
A = COOH or COOM, and
M = alkali metal or $NH_4$
and from about 5 to 100 weight percent of a dialdehyde selected from glyoxal and glutaraldehyde, based on the polyacrylamide, to water at a temperature of about 10° to 80° C. having a pH of about 5.5 to 8.5, and mixing the polyacrylamide, dialdehyde and water to form a solution.

The present invention still further contemplates a method of improving oil recovery from strata of a subterranean hydrocarbon-containing reservoir, which comprises the steps of:

(a) combining an amnomethylated polyacrylamide having a molecular weight of from about 1 to 10 million and the structural formula II with a dialdehyde selected from glyxoal and glutaraldehyde in aqueous medium at a temperature of from about 10° to 80° and pH of from about 5.5 to 8.5 to form a gel-forming composition;

(b) introducing the composition into the strata; and (c) allowing the composition to gel.

Preferably, the aqueous medium is oil field brine, and the introduction is into the strata between an injection well and a producer well whereby water flow in the strata is diverted and oil recovery at the producer well is improved, or the introduction is into strata surrounding a producer well whereby water encroachment into hydrocarbon being produced from the well is reduced. With the latter introduction, the aminomethylated polyacrylamide preferably has a molecular weight of from about 3 to 5 million, while the concentration of the polyacrylamide in the composition is from about 1000 to 6000 ppm, the dialdehyde is glyoxal at a concentration in the composition of from about 200 to 3400 ppm, and the gelling of the composition occurs at a temperature of from about 20° to 60° C. and pH of from about 6.0 to 8.0.

DETAILED DESCRIPTION OF THE INVENTION

The aqueous aldehyde cross-linked aminoalkylated polyacrylamide gel of the present invention, because of its unexpectedly superior permeability and stability characteristics, is well suited for use in the recovery of oil from subterranean oil-producing formations. The ability to reduce the formation's permeability to water or other flooding media while having little effect on its permeability to oil, coupled with the tendency to be tightly absorbed onto the rock in the formation and thereby effectively resist back pressure generated during oil production, makes this gel of particular value in producer well strata modification.

The gel is formed by combining in aqueous medium suitable amounts of an aminoalkylated polyacrylamide and an aldehyde or dialdehyde of from one to six carbon atoms, or derivatives thereof, under specified conditions to produce a gel-forming composition which is then allowed to gel.

The aminoalkylated polyacrylamide is of the structural formula I:

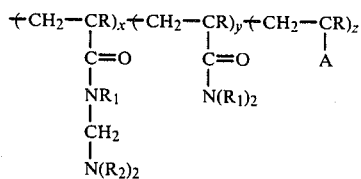

wherein
$x/(x+y+z) =$ about 0.05 to 0.99,
$z/(x+y+z) = 0$ to about 0.3,
$R = H$ or methyl,
$R_1 = H$ or alkyl of from 1 to 4 carbons,
$R_2 =$ alkyl of from 1 to 4 carbons, 2-hydroxyalkyl of 2 or 3 carbons, or when taken together with the nitrogen atom to which they are attached complete a morpholine ring, and
$A = COOH$, COOM, or $COOR_3$
wherein
$M =$ alkali metal or $NH_4$, and
$R_3 =$ alkyl of from 1 to 4 carbons.

Such aminoalkylated polyacrylamides are readily prepared by the Mannich reaction of the appropriate polyacrylamide or polyacrylamide copolymer with formaldehyde and dialkylamine under basic conditions, and many are commercially available.

Preferred are polymers of structural formula I wherein R and $R_1$ are hydrogen; $R_2$ is methyl; A is COOH or COOM; $x/(x+y+z)$ is from about 0.6 to 0.8; and $z/(x+y+z)$ is from zero to about 0.1. Especially preferred are aminomethylated polyacrylamide polymers of the structural formula II:

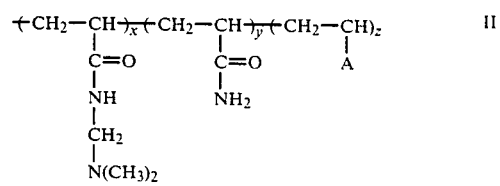

wherein
$x/(x+y+z) =$ about 0.6 to 0.8,
$z/(x+y+z) = 0$ to about 0.1,
$A = COOH$ or COOM, and
$M =$ alkali metal or $NH_4$.

While the aminoalkylated polyacrylamide may suitably have a molecular weight of from about 500,000 to 15 million, the molecular weight range is preferably from about one to ten million, especially from about three to five million.

The aldehyde is selected from formaldehyde; a dialdehyde of the formula $OHC(CH_2)_nCHO$ wherein $n = 0$ to 4; and dialdehyde starch. Preferably, the aldehyde is formaldehyde, glutaraldehyde and especially glyoxal.

The aminoalkylated polyacrylamide and aldehyde are combined in the aqueous medium at a temperature of from about 5° to 95° C., preferably 10° to 80° C. and especially 20 to 60° C., the pH of the medium being from about 5 to 10, preferably 5.5 to 8.5 and especially 6.0 to 8.0. The salinity and hardness of the aqueous medium have little if any effect on gel formation, the gelation readily occuring in brines with salinities up to about 25 percent total dissolved solids and hardness as high as 17,000 parts per million (ppm). The aminoalkylated polyacrylamide is preferably added at a concentration of from about 500 to 10,000, especially 1000 to 6000, ppm of the resulting composition, with the concentration of the aldehyde being from about 5 to 100 weight percent of the polyacrylamide, especially from about 200 to 3400 ppm of the composition.

The gel-forming composition of the present invention is especially useful for improving oil recovery from strata of subterranean hydrocarbon-containing reservoirs, either by introducing the composition into the strata between an injection well and a producer well to direct water flow in the strata and thereby improve oil recovery at the producer well, or by introducing the composition into strata surrounding a producer well to reduce water encroachment into the hydrocarbon being produced from the well. In such use, an aminomethylated polyacrylamide of the formula II having a molecular weight of from about 1 to 10 million together with a dialdehyde selected from glyoxal and glutaraldehyde are preferably employed. The polyacrylamide and dialdehyde are combined in the aqueous medium, preferably oil field brine, at a temperature of from about 10° to 80° C. and pH of from about 5.5 to 8.5 to form the gel-forming composition, and the composition is introduced into the strata and allowed to gel.

Especially desirable for modifying strata surrounding a producer well is a gel-forming composition in which the aminomethylated polyacrylamide of formula II and molecular weight of from about 3 to 5 million is combined in aqueous medium with glyoxal at concentrations of from about 1000 to 6000 ppm and 200 to 3400 ppm, respectively, such that the gelling of the resulting gel-forming composition occurs at a temperature of from about 20° to 60° C. and pH of from about 6.0 to 8.0. In utilizing this composition, the polymer and glyoxal at the desired concentrations are added to oil field brine at the desired temperature and pH to form the composition; oil production is stopped; the composition is injected into the near well bore of the producer well and allowed to stand, normally from about 2 to 10 days, to gel; and oil production is then resumed.

The following examples of the composition of the present invention, its preparation and its application to oil recovery are merely illustrative and are not to be construed as limiting the invention, the scope of which is defined by the appended claims.

EXAMPLE 1

Ampoule Test for Gel Formation

Combinations of aminoalkylated polyacrylamide and aldehyde were visually evaluated for gel formation by the following procedure: The components are added at the concentrations indicated in Table I to an aqueous brine of specified pH and total dissolved solids (TDS) content contained in a 35 ml glass pressure ampoule. The ampoule is sealed and immersed in a thermostated oil bath at a selected temperature. The solution is visually inspected for signs of gelation at intervals of 6 to 12 hours by gently inverting the ampoule. Typical results for the gelation of an aminomethylated polyacrylamide (AMPAM) cross-linked with various aldehydes are summarized in TABLE I.

TABLE I

| Effect of Aldehyde on Gelation of AMPAM | | | |
|---|---|---|---|
| Run | 1A | 1B | 1C |
| Polymer | AMPAM[1] | AMPAM | AMPAM |
| ppm | 4000 | 4000 | 4000 |
| Aldehyde | form.[2] | glut.[3] | glyoxal[4] |
| ppm | 1250 | 1780 | 1800 |
| % of polymer | 31 | 45 | 45 |
| Gel time, days[5] | 1–3 | 1–3 | 2 |

[1] dimethylaminomethyl polyacrylamide, ca. 80% dimethylaminomethylated; MW 3–5 million; Brookfield viscosity (6% aqueous solution, RT) 30,000–60,000 cps
[2] formaldehyde; as 37% aqueous solution
[3] glutaraldehyde; as 50% aqueous solution
[4] glyoxal; as 40% aqueous solution
[5] brine salinity 10% TDS; pH 8.0; temperature 22° C.

Table I demonstrates that various aldehydes cause gelation of aminoalkylated polyacrylamide in aqueous solution, the desired gelation requiring from about one to three days, a useful time range for injection of the gel-forming solution into oil field injector or producer wells prior to the gelation.

EXAMPLE 2

Simulated Oil Field Profile Modification Test

The effectiveness of the aminoalkylated polyacrylamide aldehyde gel composition of the present invention as a profile modification agent in enhanced oil recovery was determined using a laboratory sandpack apparatus to simulate downhole conditions. Such sandpack simulation is necessary to observe the desired effect, especially since gelation of the composition is not always visually apparent.

In this simulation, a standard 1 foot (30.5 cm) high by 1 inch (2.54 cm) stainless steel column was packed with unconsolidated sand (typically 60–200 mesh, U.S. Standard Sieve) as the porous medium.

Using a high pressure pump, a gel-forming solution consisting of 4000 ppm AMPAM (molecular weight 3–5 million) and 675 ppm glyoxal in North Sea brine at H 8.0 and room temperature was injected into the sandpack. A total of three pore (void) volumes of the solution was injected following a determination of the permeability of the sand to water at residual oil saturation ($K_{WI}$) using Darcy's Law. The sandpack was allowed to stand for seven days at room temperature to permit the gel-forming solution to gel. At the end of the standing period, the permeability of the sandpack was again measured ($K_{WF}$).

The procedure was then repeated using a brine solution containing 3000 ppm AMPAM and no glyoxal.

The results of the testing are summarized in Table II. The reduction in water permeability of the sandpack by a factor of 48 clearly demonstrates the ability of the presently claimed gel-forming composition to act as an oil field profile modification agent.

TABLE II

| Effect of AMPAM Glyoxal Gel on Water Permeability Reduction | | |
|---|---|---|
| Run | 2A | 2B |
| AMPAM, ppm | 4000 | 3000 |
| Glyoxal, ppm | 1000 | 0 |
| Permeability, mD | | |
| Initial ($K_{WI}$) | 860 | 880 |
| Final ($K_{WF}$) | 18 | 880 |
| $K_{WI}/K_{WF}$ | 48 | 1.0 |

EXAMPLE 3

Simulated Oil Field Producer Well Test

The effectiveness of the gel-forming composition of the present invention in reducing water encroachment at the producer well was simulated using the sandpack apparatus and procedure described in Example 2, with the exception that the permeability of the porous media to oil as well as to water was measured. In addition, the gel-forming solution was emplaced in the column in a flow direction opposite from that used for the permeability determination in order to simulate the flows in a production well. Also, the ability of the resulting gel to withstand the high pressure generated in tee near wellbore area of the well when oil production is resumed was simulated by measuring the permeability of the sandpack at various flow rates and pressure gradients; the point at which the response does not obey Darcy's Law for flow through porous media is recorded as the break pressure, expressed in psi/ft.

The producer well simulation was repeated using as strata profile modifying agent a nonionic polyacrylamide cross-linked with glyoxal, as taught by U.S. Pat. No. 4,155,405, and also a currently commercial producer well product.

Results of the testing are summarized in Table III.

TABLE III

| | Producer Well Simulation Test | | |
|---|---|---|---|
| Run | 3A | 3B | 3C |
| Polymer | AMPAM | PAM[1] | HPAM[2] |
| ppm | 2500 | 5000 | 11250 |
| Cross-linker | glyoxal | glyoxal | $Cr^{+6}$ $NaHSO_3$ |
| ppm | 2500 | 5000 | 300 1500 |
| Water perm., $K_{WI}/K_{WF}$ | 40 | 19.3 | 24 |
| Oil perm., $K_{OI}/K_{OF}$ | 1.9 | 2.8 | 2.2 |
| Break pres., psi/ft | 750 | 300 | 100 |

[1]polyacrylamide: MW 6 million; less than 10% hydrolysis
[2]hydrolyzed polyacrylamide; MW 0.5-1.0 million; 10-30% hydrolysis These results clearly show the unexpectedly superior performance of the gel-forming composition of the present invention over agents previously employed for producer well modification. In oil field producer wells, the treating agent should reduce water permeability without materially reducing oil permeability, a water reduction ratio of greater than 5, preferably over 10, with an oil reduction ratio of under 2, preferably near 1, being desired. This water permeability reduction should be accomplished with a high break pressure. The present gel-forming composition readily meets these criteria.

EXAMPLE 4

Effect of Polymer Molecular Weight

Aminomethylated polyacrylamides of varying molecular weight were evaluated for water and oil permeability reduction employing the sandpack test procedure of Examples 2 and 3, with the results summarized in Table IV.

TABLE IV

| | Effect of Polymer Molecular Weight | | |
|---|---|---|---|
| Run | 4A | 4B | 4C |
| AMPAM MW, million | 1 | 5 | 9 |
| Conc., ppm | 4000 | 4000 | 1500 |
| $K_{WI}$, mD | 547 | 564 | 495 |
| $K_{WI}/K_{WF}$ | 14.3 | 57 | 17.0 |
| $K_{OI}/K_{OF}$ | 1.1 | 1.7 | 1.0 |

These results show that effective producer well performance can be achieved with aminoalkylated polyacrylamides of varying molecular weight, the performance being achieved at a lower concentration of higher molecular weight polymer.

EXAMPLE 5

Effect of Temperature and pH

The sandpack test procedure of Examples 2 and 3 was run at various solution temperatures and pH using as brine a 2 percent potassium chloride solution, with the results summarized in Table V.

TABLE V

| | Effect of Gelation Temperature and pH | | |
|---|---|---|---|
| Run | 5A | 5B | 5C |
| Temp., °C. | 22 | 40 | 60 |
| pH | 8.0 | 7.5 | 6.5 |
| AMPAM, ppm | 3000 | 4500 | 4500 |
| Glyoxal, ppm | 680 | 1530 | 2040 |
| $K_{WI}$, mD | 980 | 920 | 1320 |
| $K_{WI}/K_{WF}$ | 3.1 | 4.7 | 4.7 |
| $K_{OI}/K_{OF}$ | 1.0 | 1.1 | 1.1 |

These results show that effective aminoalkylated polyacrylamide aldehyde gels are readily formed over a wide temperature range. The results also show the interdependence of gelation temperature and pH. In order to compensate for faster gelation rates at higher temperatures, the initial pH of the gel-forming solution is lowered to maintain the gelation time in the desired range of from about one to three days.

EXAMPLE 6

Effect of Solution Salinity

The sandpack test procedure of Examples 2 and 3 was repeated using Berea sandstone cores rather than sand, and aqueous media of varying salinity for the composition preparation and emplacement, with the results shown in Table VI. The compositions of these aqueous saline solutions are summarized in Table VIA.

TABLE VI

| | Effect of Water Salinity[1] | | | |
|---|---|---|---|---|
| Run | 6A | 6B | 6C | 6D |
| Degree salinity, % TDS | 25 | 10 | 10 | 1 |
| $K_{WI}$, mD | 29 | 22 | 33 | 71 |
| $K_{WI}/K_{WF}$ | 4.5 | 7.3 | 4.9 | 1.7 |
| $K_{OI}/K_{OF}$ | 1.0 | 1.2 | 1.0 | 1.0 |
| Break pres., psi/ft | 280 | 230 | 260 | 320 |

[1]AMPAM, 1500 ppm; glyoxal, 375 ppm; temp. 25° C.; pH 8.0

TABLE VIA

| | Salinity Composition | | |
|---|---|---|---|
| Degree Salinity | % TDS | Hardness ppm (Mg, Ca) | Alkalinity, ppm (as $HCO_3$) |
| 25 | 25 | 17,000 | 0 |
| 10 | 10 | 5,500 | 220 |
| 1 | 1 | 100 | 100 |

These results show that the present aminoalkylated polyacrylamide aldehyde composition meets the producer well standards for salinities up to and including 25 percent total dissolved solids. This is extremely important, since oil field reservoirs have connate waters of salinity contents varying from fresh water to brines of greater than 20 percent total dissolved solids content, and the oil field gelant to be effective must be compatible with brines of all salinities. Such compatibility eliminates the possibility of, for example, precipitation with resultant plugging of oil rich zones in the formation.

EXAMPLE 7

Effect of Formation Permeability and Temperature

The sandpack procedure of Examples 2 and 3 was repeated using a sandpack of low temperature and permeability and a second sandpack of high temperature and permeability, with the results summarized in Table VII.

TABLE VII

Effect of Sandpack Permeability and Temperature

| Run | 7A | 7B |
|---|---|---|
| $K_{WI}$, mD | 135 | 1321 |
| Temp., °C. | 22 | 60 |
| pH | 8.0 | 6.5 |
| Salinity, % TDS | 10 | 2 |
| AMPAM, ppm | 1500 | 4500 |
| Glyoxal, ppm | 340 | 2040 |
| $K_{WI}/K_{WF}$ | 3.2 | 4.7 |
| $K_{OI}/K_{OF}$ | 1.0 | 1.1 |

These results show that the effective utilization of the present aminoalkylated polyacrylamide aldehyde composition requires careful selection of the polymer and aldehyde concentrations in the composition to meet the permeability and temperature characteristics of the formation being treated.

EXAMPLE 8

Effect of Formation Composition

The sandpack test procedure of Examples 2 and 3 was repeated using a crushed carbonate rather than sand as the porous media, with the results summarized in Table VIII.

TABLE VIII

Use of Carbonate Media[1]

| Run | 8A | 8B |
|---|---|---|
| $K_{WI}$, mD | 63 | 209 |
| AMPAM, ppm | 1750 | 2000 |
| Glyoxal, ppm | 400 | 450 |
| $K_{WI}/K_{WF}$ | 5.6 | 3.6 |
| $K_{OI}/K_{OF}$ | 1.8 | 1.6 |

[1]crushed carbonate sandpack, 25° C., pH 8.0, brine 2% KCl

Oil field formations are commonly characterized as sandstone or carbonate lithologies. The above results demonstrate that the aminoalkylated polyacrylamide aldehyde composition of the present invention is effective in carbonate as well as sandstone formations.

We claim:

1. A method of improving oil recovery from strata of a subterranean hydrocarbon-containing reservoir, which comprises the steps of:
    (a) combining an aminomethylated polyacrylamide having a molecular weight of from about 1 to 10 million and a structural formula II

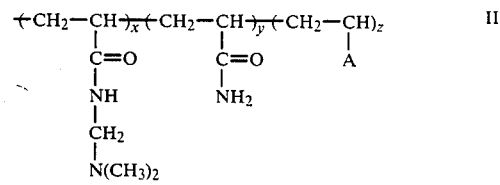

wherein
$x/(x+y+z)$ = about 0.6 to 0.8,
$z/(x+y+z)$ = 0 to about 0.1,
A = COOH or COOM and
wherein
M = alkali metal or $NH_4$
with a dialdehyde selected from glyoxal and glutaraldehyde in aqueous medium at a temperature of from about 10° to 80° C. and pH of from about 5.5 to 8.5 to form a gel-forming composition;
    (b) stopping oil recovery from the strata;
    (c) introducing the composition into the strata;
    (d) allowing the composition to gel; and
    (e) resuming oil recovery from the strata.

2. The method of claim 1 wherein the aqueous medium is oil field brine.

3. The method of claim 1 wherein the introduction is into the strata between an injection well and a producer well whereby water flow in the strata is diverted and oil recovery at the producer well is improved.

4. The method of claim 1 wherein the introduction is into strata surrounding a producer well whereby water encroachment into hydrocarbon being produced from the well is reduced, and oil recovery at the producer well is improved.

5. The method of claim 4 wherein the polyacrylamide has a molecular weight of from about 3 to 5 million; the concentration of the polyacrylamide in the composition is from about 1000 to 6000 ppm; the dialdehyde is glyoxal at a concentration in the composition of from about 200 to 3400 ppm; and the gelling of the composition occurs at a temperature of from about 20° to 60° C. and a pH of from about 6.0 to 8.0.

* * * * *